O. M. NACKER.
VEHICLE AXLE.
APPLICATION FILED MAR. 8, 1919.

1,430,833.

Patented Oct. 3, 1922.
3 SHEETS—SHEET 2.

Inventor
Owen M. Nacker

By Whittemore Hulbert & Whittemore
Attorneys

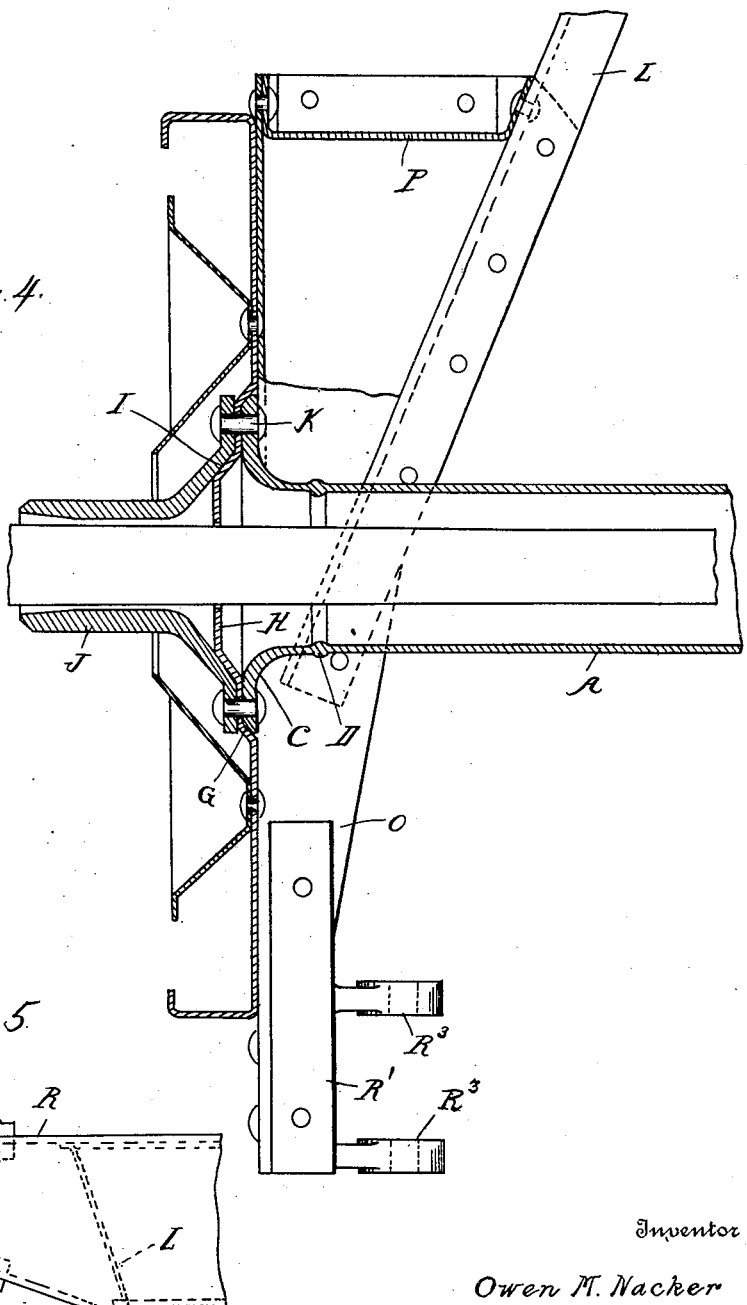

Patented Oct. 3, 1922.

1,430,833

UNITED STATES PATENT OFFICE.

OWEN M. NACKER, OF DETROIT, MICHIGAN, ASSIGNOR OF ONE-HALF TO ALANSON P. BRUSH, OF DETROIT, MICHIGAN.

VEHICLE AXLE.

Application filed March 8, 1919. Serial No. 281,522.

*To all whom it may concern:*

Be it known that I, OWEN M. NACKER, a citizen of the United States of America, residing at Detroit, in the county of Wayne and State of Michigan, have invented certain new and useful Improvements in Vehicle Axles, of which the following is a specification, reference being had therein to the accompanying drawings.

The invention relates to vehicle axles and comprises various features of construction as hereinafter set forth.

In the drawings:

Figure 4 is a horizontal section in the plane of the axle housing.

Figure 5 is a side elevation of a portion of Figure 4.

Figure 1:
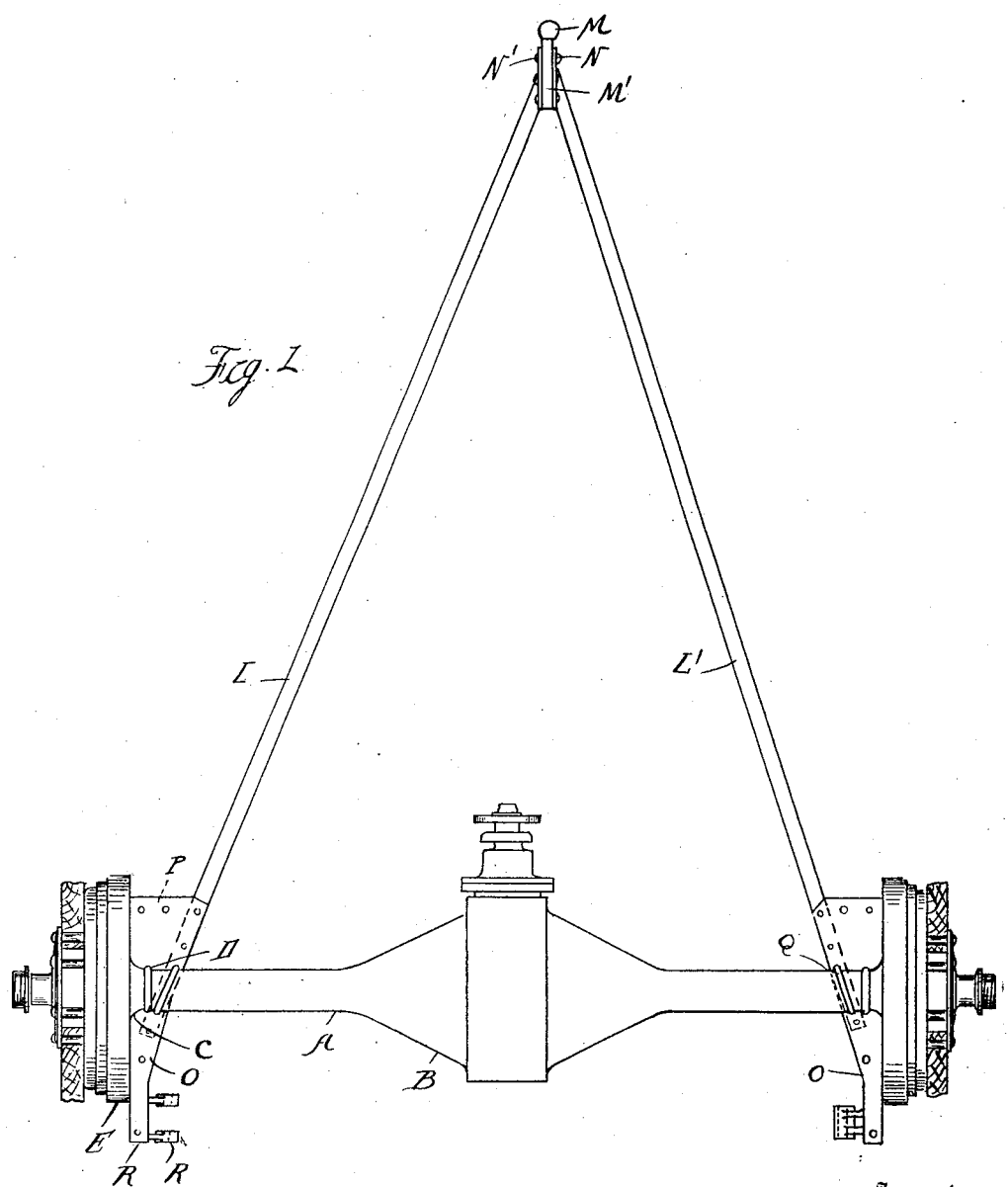
Figure 1 is a plan view.
Figure 2:
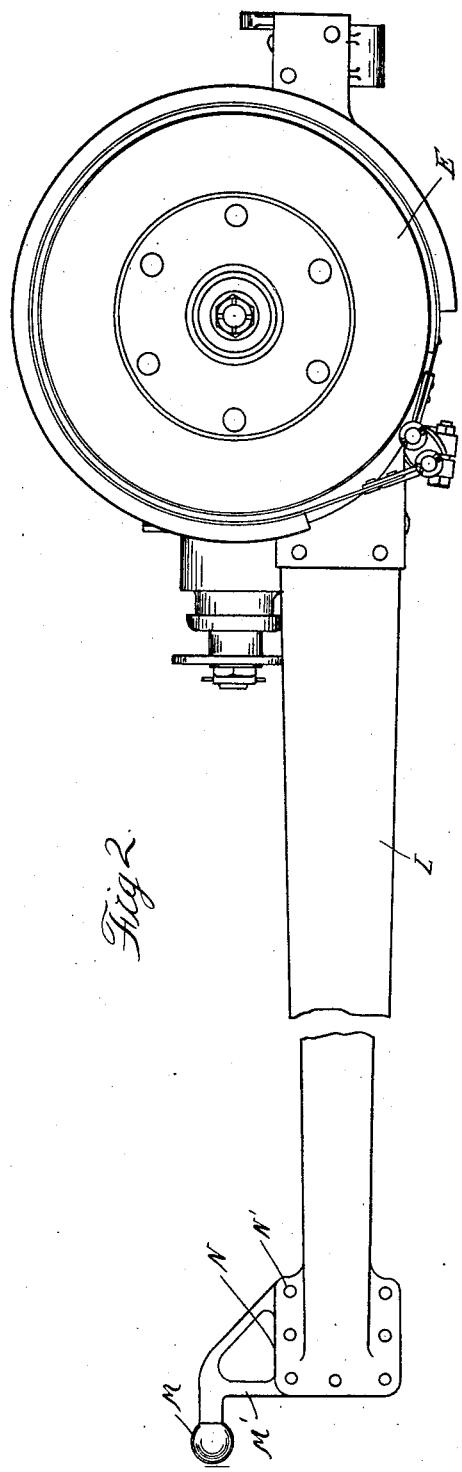
Figure 2 is a side elevation.
Figure 3:
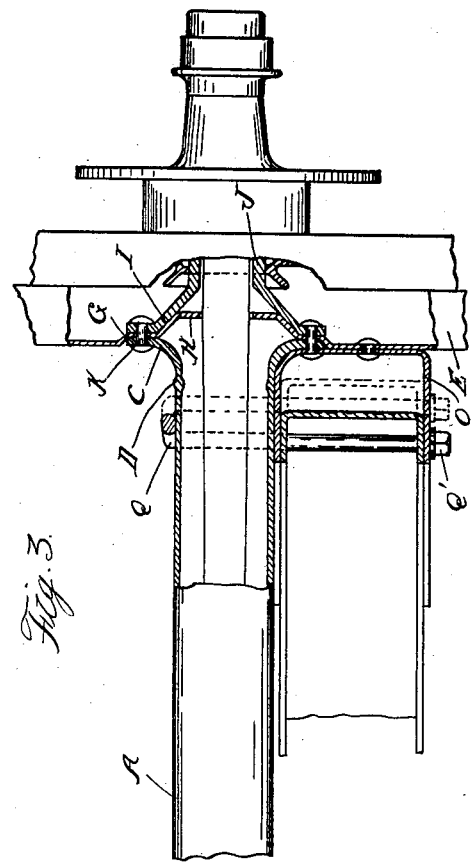
Figure 3 is an end elevation, partly in section.

As specifically shown, the improved axle is of that type comprising a divided thrust and torque arm extending from opposite ends of the axle to a common point of attachment to the vehicle frame. This type has the advantage of directly transmitting the forward thrust without stress upon the axle housing. Also the braking torque is transmitted directly from the brake head to the torque arm without stress upon the axle housing. One of the features of the improvement is therefore the construction of this thrust and torque arm and the manner of connecting the same to the brake head. Another feature of the invention is the construction of the wheel-engaging portion of the axle, the brake head and means for assembling these parts in relation to each other. And still another feature is the arrangement of the spring supports.

In detail, A is the axle housing, preferably formed of pressed sheet metal and having the enlargement B at the center for receiving the differential gearing. At the outer ends of the housing A are the flanges C, preferably formed of heavier gauged metal, united by welding or otherwise, as indicated at D. E is the brake head formed of pressed sheet metal and having a central recess for receiving the flange C and the bevel shoulder portion G for engaging the peripheral edge of said flange to hold the head concentric with the axle. The head is also provided with an inner depression H having a bevel shoulder portion I for fitting a corresponding bevel on the member J forming an extension of the axle. This member J constitutes the wheel bearing and is preferably the inner race member of the roller bearing within the hub of the wheel. By reason of its engagement with the bevel shoulder I this member J will be held in true axial alignment with the member A. These two members may thus be secured to each other by rivets K, which also secure the brake head P, and the load is carried through the joint without shearing stress on the rivets by reason of the bevel shoulders G and I.

The driving thrust and the torque stresses are transmitted from the axle to the vehicle frame through a pair of obliquely arranged arms L and L' connected together at their forward ends and to a ball member M for universal pivotal connection to the frame. The arms L are preferably channel bars and are of a diminishing depth in cross-section from their rear ends to their forward ends. At their forward ends these members are preferably provided with flanges N arranged upon opposite sides of a flat shank M' which carries the ball M. The flanges and shank are secured by rivets N'. At their rear ends the arms L and L' are preferably connected by pressed channel members O which embrace the flanges of the arms L and L' and are secured thereto by riveting. The members O are of substantially triangular form in plan view, the web portion of the channel lying parallel to the brake head E and extending beneath the axle housing A, being secured to the brake head by riveting. At the forward end or large end of the triangle there is arranged a brace or strut member P, which is flanged and secured to the members O and L by riveting. There is also an additional securing attachment to the axle housing A formed by a U-strap Q which embraces the housing and extends upward through the channel member, being threaded at its upper ends to engage nuts Q'. Thus the arms L and L' are rigidly attached to the axle housing and the brake head and both the driving thrust and torque stresses are carried through these connections into the arms and thence through the ball M into the vehicle frame.

With a certain type of motor vehicles the frame is supported upon the axle by a transversely arranged upwardly bowed spring having its opposite ends secured to the axle and centrally connected to the frame. The vertical height between the axle and the side sills of the frame is seldom sufficient to receive the spring, and therefore it has been found necessary to bow upward the cross strut to which the spring is attached. With the present invention this construction has been avoided by arranging the spring in rear of the axle and by hanging its opposite ends at points sufficiently low to provide clearance between the same and the cross strut on the frame. There is also provided hangers for the springs by extending the members O rearward and securing thereto the perch members R. These, as shown, are formed of pairs of pressed sheet metal members R' and R² having flanges arranged respectively outside and inside of the flanges of the member O and secured thereto by riveting. The members R' and R² have the projecting portions R³ forming furcations for embracing the spring and being apertured for the passage of the securing bolt or pin.

With the construction as described, pressed sheet metal members have been largely substituted for castings and forgings, dispensing with many machining operations and also resulting in greater strength. In addition, there is the advantage of carrying the driving and torque stresses directly from the ends of the axle through the reach and torque arms to the point of pivotal engagement with the frame, thereby permitting of a lighter construction in the axle housing.

What I claim as my invention is:

1. The combination with a tubular axle housing having a flanged end, of a wheel bearing extension of said axle provided with a correspondingly flanged end, a sheet metal brake head interposed and clamped between the flanges and having pressed portions forming a shouldered engagement with the same for transmitting load stresses from one axle member to the other.

2. The combination with a tubular axle housing having a flanged end, of a wheel bearing extension member for said housing having a correspondingly flanged end, and a sheet metal brake head interposed and clamped between said flanges, having pressed portions respectively overlapping and underlapping said axle members.

3. The combination with a tubular axle housing having a flanged end, of a member forming a wheel bearing extension of said axle housing provided with a correspondingly flanged end, and a sheet metal brake head having concentric pressed panels therein, one of said panels receiving and fitting the flange on the axle housing and the other panel fitting within the extension member to form a pilot therefor.

4. The combination with a tubular axle housing, of a brake head secured to the end portion thereof, a torque and reach arm extending from said brake head obliquely forward, and a gusset connection between said reach and torque arm and brake head.

5. The combination with a tubular axle housing and a brake head secured to the end portion thereof, of a reach and torque arm extending in a plane clearing said axle housing from said brake head obliquely forward, a gusset connection between said reach and torque arm and brake head, and a clamping connection between said arm and the axle housing.

6. The combination with a tubular axle housing and a brake head mounted on the end portion thereof, of a reach and torque arm extending obliquely from said brake head in a plane clearing said axle housing and forward and rear thereof, a connection between said arm and the brake head, and a spring attachment mounted on the rear extension of said arm.

7. The combination with a tubular axle housing and a brake head mounted on the end portion thereof, of a reach and torque arm extending obliquely from said brake head in a plane beneath said axle housing, a connection between said brake head and arm, and a spring attachment secured to the rearward extension of said arm.

8. The combination with a tubular axle housing having a brake head on the end portion thereof, of a torque and reach arm extending from said brake head obliquely forward, and a gusset member of channel-shaped cross-section embracing and secured to said arm and having its web portion secured to said brake head.

9. The combination with a tubular axle housing having a brake head on the end portion thereof, of a torque and reach arm extending from said brake head obliquely forward, a gusset member of channel-shaped cross-section embracing and secured to said arm, having its web portion attached to the brake head, and a bracing or strut plate within the channel of said gusset member.

10. The combination with a tubular axle housing having a flanged end, of a wheel bearing extension of said axle having a flanged end, a brake head provided with means cooperating with said housing and extension to position the same relative to each other, and means for securing said flanged ends and head together.

11. The combination with a tubular axle housing having a flanged end, of a wheel bearing extension of said axle provided with a flanged end, a brake head arranged between said flanged ends and provided with shoulders engaging said housing and extension for aligning the same, and means for securing said housing, extension and intermediate head together.

In testimony whereof I affix my signature.

OWEN M. NACKER.